US005558351A

United States Patent [19]
Hunter

[11] Patent Number: 5,558,351
[45] Date of Patent: Sep. 24, 1996

[54] ANTI-JACK-KNIFE ASSEMBLY

[76] Inventor: David Hunter, HCR 66, Box 75, Yellville, Ark. 72687

[21] Appl. No.: 321,146

[22] Filed: Oct. 11, 1994

Related U.S. Application Data

[62] Division of Ser. No. 453,301, Dec. 20, 1989, abandoned, and a division of Ser. No. 753,208, Aug. 30, 1991, abandoned, and a division of Ser. No. 763,879, Sep. 20, 1991, abandoned.

[51] Int. Cl.⁶ ........................................ B60D 1/06
[52] U.S. Cl. ................... 280/432; 280/455.1; 280/511
[58] Field of Search ................ 280/446.1, 432, 280/433, 448, 455.1, 457, 474, 511

[56] References Cited

U.S. PATENT DOCUMENTS

| | | | |
|---|---|---|---|
| 4,120,514 | 10/1978 | Sanders | 280/432 |
| 4,204,700 | 5/1980 | Haines | 280/432 |
| 4,211,428 | 7/1980 | Barcus | 280/511 |
| 4,556,232 | 12/1985 | Sever | 280/432 |
| 4,573,699 | 3/1986 | Smith | 280/432 |
| 4,921,266 | 5/1990 | Beals | 280/415.1 |

*Primary Examiner*—Anne Marie Boehler

[57] ABSTRACT

A trailer hitch particularly for pick-up trucks and other relatively light towing vehicles having an improved hitch assembly including a retractable pin assembly in combination with guide members for limiting angular movement of a trailer behind the towing vehicle. An improved cylinder, pin and restrictor plate assembly provides a rebound or kick back to return or urge the jack-knifed trailer back to a position substantially trailing behind the truck. The cylinder improved in providing positive action in both retraction and extension of the pin.

12 Claims, 4 Drawing Sheets

ANTI-JACK-KNIFE ASSEMBLY

This is a DIVISIONAL application from Ser. No. 7/453,301, filed Dec. 20, 1989, now Abandoned; Ser. No. 07/753,208, filed Aug. 30, 1991, now Abandoned; and Ser. No. 07/763,879, filed Sep. 20, 1991, now Abandoned.

BACKGROUND OF THE INVENTION

The present invention relates in general to trailer hitches and pertains, more particularly, to a trailer hitch directed to an improved hitch assembly having a retractable pin assembly in combination with guide meters for limiting angular movement of the trailer behind a towing vehicle. The hitch of this invention is an improvement over the conventional ball hitch and fifth wheel hitch. The assembly of this invention further provides an improved retraction cylinder assembly and an anti-jack-knife assembly that counteracts the effects of a trailer jack-knife.

With the conventional trailer hitch assembly it is generally necessary to drive with extreme caution to avoid losing control of the trailer being towed. Anti-jack-knife assembly are known for use with semi-trailer combinations. U.S. Pat. No. 4,120,514 for a safety device for tractor-trailers to prevent jackknifing discloses a retractable pin assembly and slot. This assembly, as well as others known to the trucking industry, are not adaptable to smaller pickup truck trailer and pickup truck fifth wheel combinations.

Another drawback associated with the foregoing assembly, co-invented by the applicant, is the tendency for the actuator assembly to operate sluggishly or possibly not at all if, for example, proper maintenance procedures are not followed.

Conventional anti-jack-knife devices also have a drawback especially related to the position of a jack-knifed trailer or similar rig.

Accordingly, it is an object of the present invention to provide an improved anti-jack-knife assembly that adapted for use on pickup truck and trailer combinations or with other relatively lighter vehicles. A passenger automobile trailer hitch may be adapted for use with this invention.

Another object of the present invention is to provide an improved trailer hitch that is constructed with a retractable pin assembly. The pin assembly is operated from the towing vehicle as needed.

A further object of the present invention is to provide a trailer hitch or fifth wheel assembly that has more versatility and flexibility than conventional devices.

Still another object of the present invention is to provide an anti-jack-knife assembly that is constructed for improved reliability. The improved assembly of this invention provides an actuator assembly that is positively acting in both directions for added control of a moveable pin.

Still a further object of the present invention is to provide an improved anti-jack-knife assembly construction that is adapted for overcoming a jack-knifed position and hopefully allowing a driver to regain vehicle control sooner.

SUMMARY OF THE INVENTION

To accomplish the foregoing and other objects of this invention there is provided a trailer hitch and fifth wheel assembly for attaching trailers to towing vehicles with the capability of reducing the occurrence of jack-knife style accidents and stabilizing the towed trailer. The assembly comprises the combination of a vehicle adapted for pulling a trailing vehicle with hitch means for operably connecting the vehicle and trailing member.

To further accomplish the foregoing and other objects of this invention there is provided a trailer hitch and fifth wheel assembly for attaching towing vehicles with the inherent capability of providing a spring back from a substantially jack-knifed position to a substantially non-jack-knifed position. The assembly comprises the combination of a moveable pin and pin receiving member manufactured from material satisfying at least two design criteria.

First, the pin and pin receiving member can withstand the forces associated with the jack-knife of the trailer. Also, the pin and the pin receiving member introduce a recoil or spring back condition to effectively kick the jack-knifed trailer back to a substantially normal trailing position behind the powered vehicle.

The hitch means includes one hitch means portion operatively associated with the vehicle and another hitch means portion operatively associated with the trailing vehicle. The assembly further includes retractable means for operative engagement with one or the other hitch means portion for restricting trailing vehicle over-swing with respect to the vehicle. This provides the desired anti-jack-knife feature of this invention.

Retractable member activating means is provide, typically in a cab or driver portion of the towing vehicle. The retractable means operates for selective engagement of a respective hitch receiving means portion. Further support means are provided operatively associated with hitch means and provide trailer hitch support. Preferred embodiments of this invention include a pick-up truck having a fifth wheel assembly mounted in the truck bed and a pick-up truck having a hitch assembly.

These and other objects and features of the present invention will be better understood and appreciated from the following detailed description of embodiments thereof, selected for purposes of illustration and shown in the accompanying drawings.

DETAILED DESCRIPTION

Figure 1:
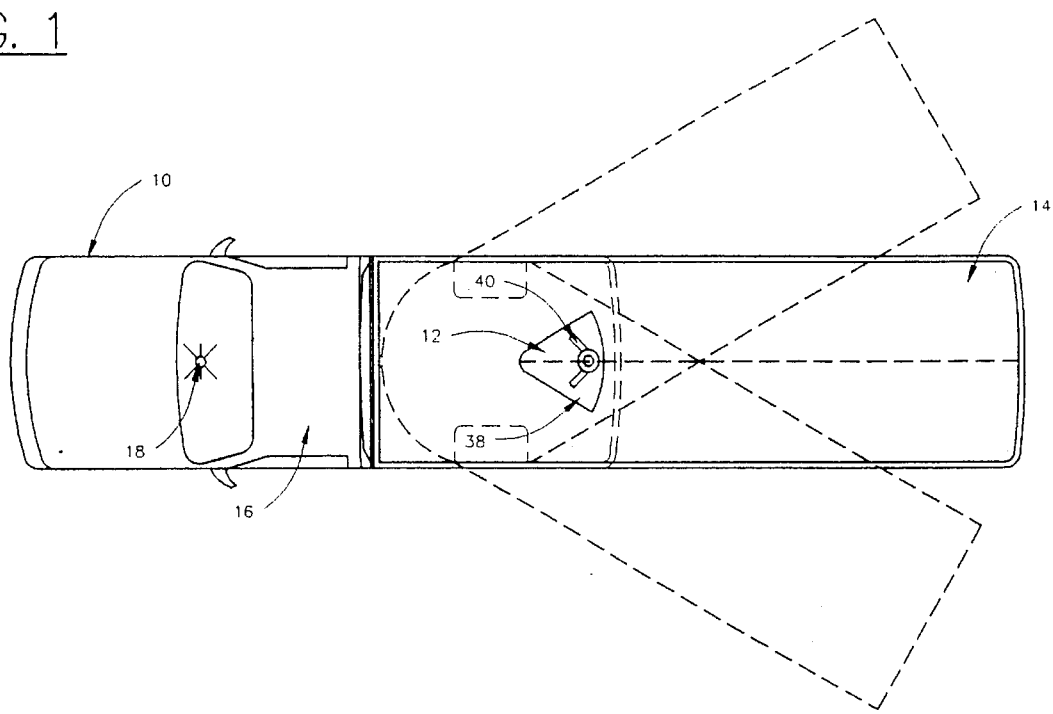
FIG. 1 is a schematic illustration of a vehicle equipped with a fifth wheel for towing a trailer and incorporating the anti-jack-knife and stabilizing assembly of the present invention.

Referring now to the drawings there is shown a plurality of two preferred embodiments for the hitch assembly of this invention. One hitch assembly is described in connection with a pickup and fifth wheel application to tow a trailer or similar vehicle. Another hitch assembly is then described in connection with a pickup and ball hitch application to tow a trailer or similar vehicle. It will be understood that the ball hitch embodiment is readily adaptable to an automobile application (not shown).

Another embodiment of the improvement of the present invention is illustrated and described with respect to a tractor and trailer combination with a fifth wheel and king pin and plate combination.

The drawings show a truck 10 equipped with a fifth wheel assembly 12 for towing a trailer 14. Fifth wheel assemblies are typically used for towing heavier trailers, such as might be used for horses. The truck 10 has a cab portion 16 in which an activation means will be installed. In one preferred embodiment a switch 18 is mounted on dashboard of the cab or other location readily accessible by the driver or a passenger.

As is typical for conventional fifth wheel assemblies, a truck bed 20 carries a gooseneck and ball hitch assembly 22 providing primary operating components of the fifth wheel assembly 12. Included therein is a gooseneck 24, a ball 26, and a ball hitch portion 28 of the gooseneck. In the improved stabilizing hitch assembly of this invention the fifth wheel further includes a retractable pin assembly 30.

Figure 2:
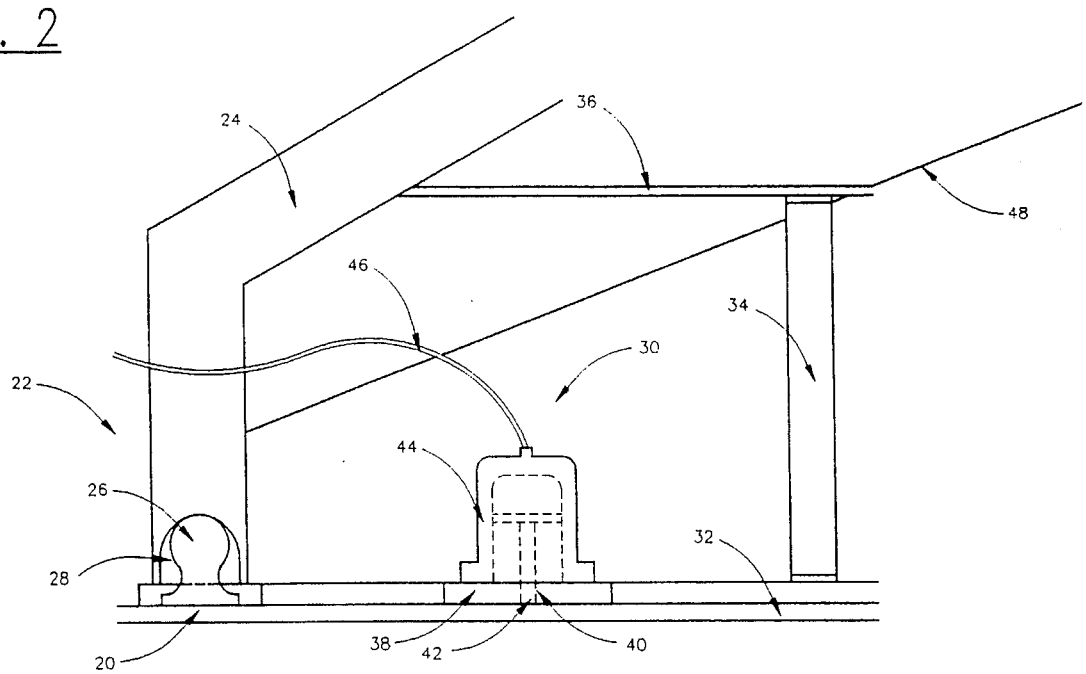
FIG. 2 is an elevation view of the assembly incorporated into the vehicle depicted in FIG. 1.

In one preferred assembly, the assembly 30 includes an assembly lower support plate 32, an assembly vertical support member 34, and an assembly upper support plate 36. It will be understood that other fifth wheel assembly structures may be substituted for the one depicted in the accompanying drawing figures. A portion of the trailer undercarriage 48 is depicted in FIG. 2.

The improved fifth wheel assembly 12 further includes a pin receiving plate 38 defining a pin receiving slot 40. A retractable pin 42 is operated by a pin retracting apparatus 44. A control line 46 extends to the activation switch 18. A power source is not shown, however, it will be understood that the pin 42 may be controlled by an electric device (e.g., a solenoid) or a hydraulic or vacuum or compressed air source.

The fifth wheel assembly is stabilized against jack-knife as described above. Furthermore, the lower support plate 32 further stabilizes the trailer as it rides on the pin receiving plate 38. It is expected that the support structure for the retracting apparatus will provide an additional stabilization surface between the truck and trailer. This arrangement should result in improved towing performance and a more level riding towed vehicle.

Figure 3:
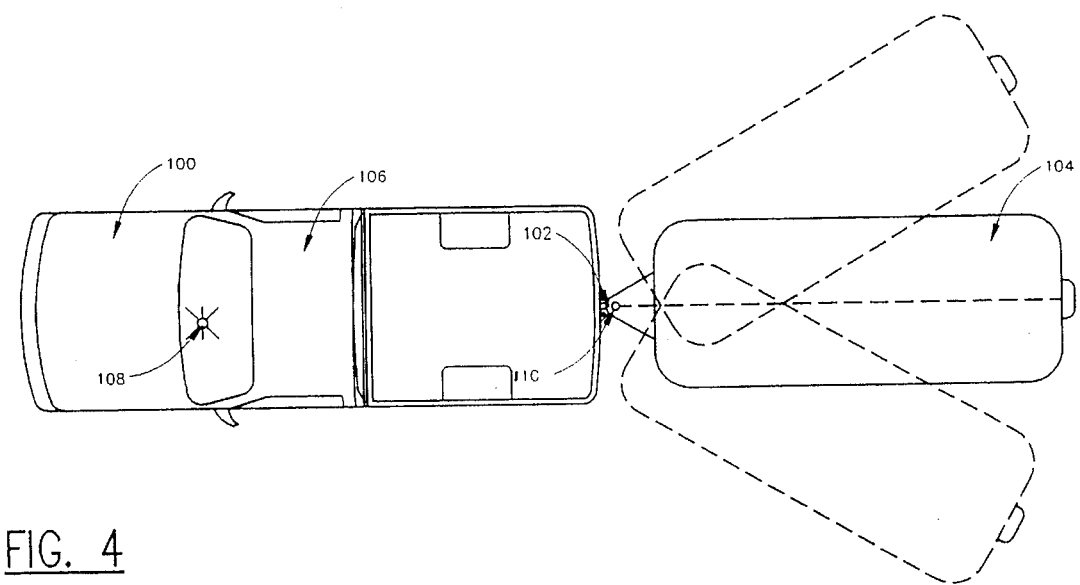
FIG. 3 is a schematic of another pickup style vehicle equipped with a stabilizing hitch assembly of the present invention.
Figure 4:
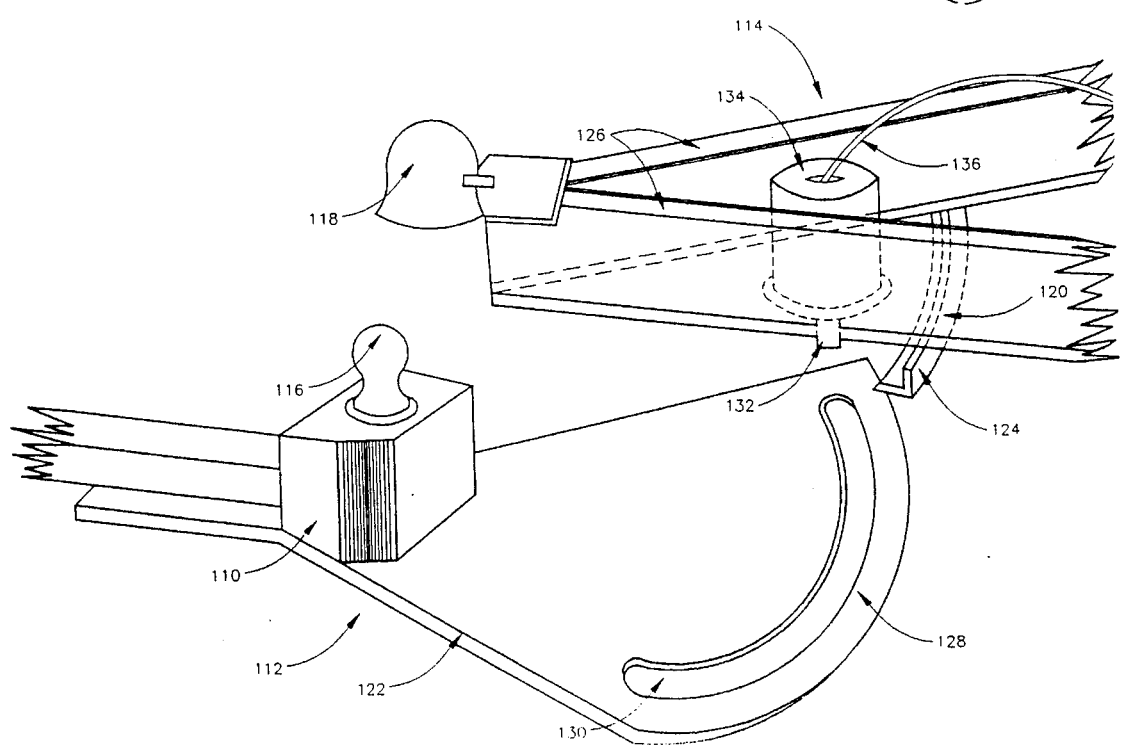
FIG. 4 is an elevation view of the assembly incorporated into the vehicle depicted in FIG. 3.
Figure 5:
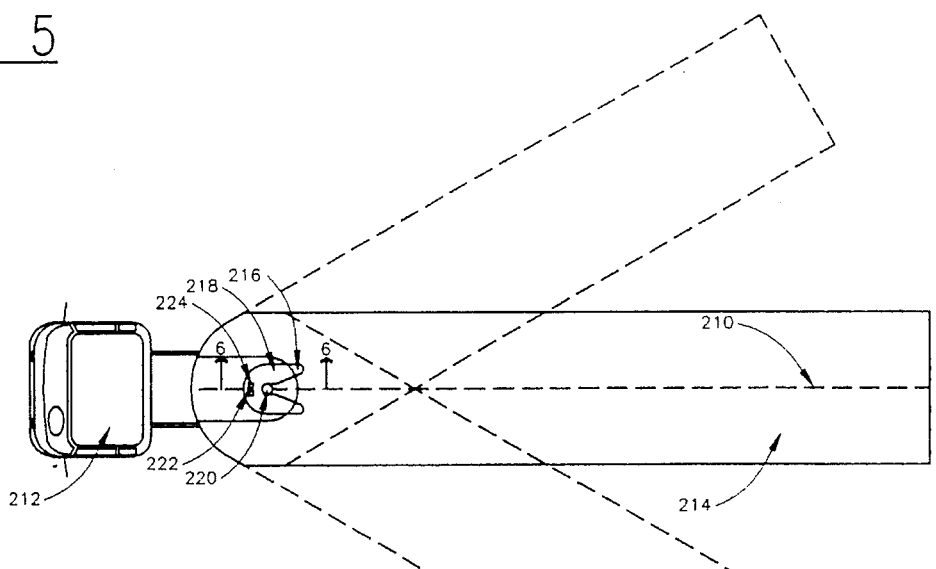
FIG. 5 is a plan view of a truck and trailer combination illustrating trailer motion during a jack-knife.

Another preferred embodiment is depicted in FIGS. 3 and 4 which show a pick-up truck 100 with an hitch assembly 102 for towing a trailer 104. The truck includes a cab 106 and an activation means or switch 108 is preferably mounted on a dashboard in the cab. Other mounting locations may be used. The rear of the truck carries the hitch 110.

A retractable pin, ball hitch assembly 112 is depicted in FIG. 4. The assembly includes the trailer hitch 114, a ball member 116, and a ball hitch 118. A retractable pin assembly 120 includes an assembly lower support plate 122, an assembly lateral guide member 124, and a trailer portion of the hitch including a typical assembly and yoke support members 126. A pin receiving portion 128, a pin receiving slot 130, and a retractable pin 132 provide the driver controlled portion of the assembly.

A pin retracting assembly or apparatus 134 is activated from the cab by means of a control line 136. Power for operating the retracting assembly is discussed above.

In order to dispel any possible misunderstanding, as described below with respect to the operation of this invention, in use in emergency situations the pin is projected into the receiving slot and the angular movement of the towed vehicle is restricted to the arc of the slot. In a preferred embodiment the slot defines an arc of 60° or less. This may vary from vehicle to vehicle and a variety of slot arcs could be provided.

The pin is of suitable size and of a material necessary to prevent the pin from shearing or failing under the most extreme jack-knife conditions. Specific materials and dimensions have not been provided due to the many variations possible.

However, it has been discovered that particular material combinations of members of the assembly of the present invention provide an additional advantage over conventional anti-jack-knife devices. Referring now to FIGS. 5-8. king pin and king pin plate with fifth wheel coupler arrangement has been depicted. A line 210 indicates the normal centerline of the truck and trailer combination. The dashed outline of the trailer illustrates the limits of trailer movement during a potential jack-knife when the anti-jack-knife assembly is utilized and working properly.

In the preferred embodiment illustrated a tractor 212 tows a trailer 214. Coupling is accomplished with a modified fifth wheel 216 and king pin plate 218. A king pin 220 is guided by the fifth wheel 216 into engagement with the king pin plate 218.

A cylinder pin 222 engages a restrictor plate 224 as disclosed in U.S. Pat. No. 4,120,514.

The anti-jack-knife assembly and an operator cylinder 226 for moving the pin 222 have been modified as will be described below.

The operator cylinder 226 is provided with a pair of ports 228 and 230 in operative communication with the chamber in which the cylinder pin 222 and piston 234 moves. A seal member 232 effectively isolates the chamber portions in which the pair of ports are located. The arrangement provides a positively acting, double action piston arrangement.

Figure 6:
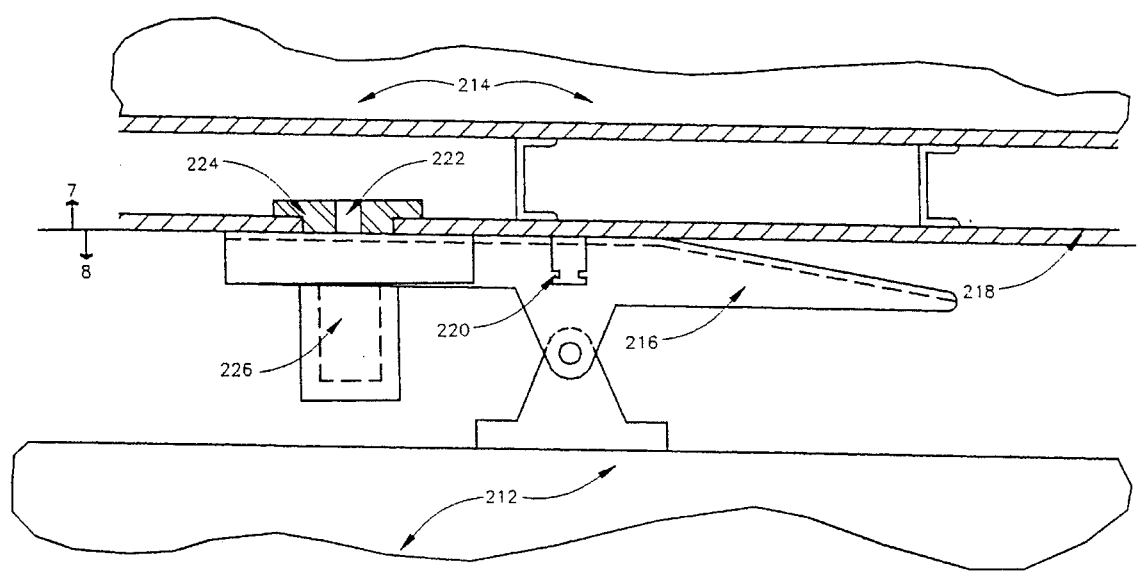
FIG. 6 is a partial section taken along line 6—6 in FIG. 5.
Figure 8:
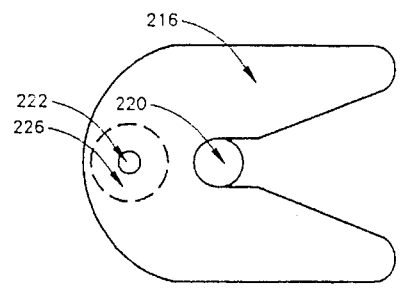
FIG. 8 is a simplified plan view of a fifth wheel coupler in accordance with the present invention.
Figure 7:
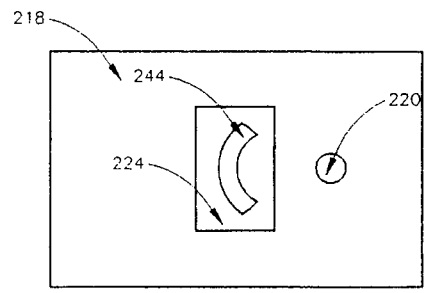
FIG. 7 is a simplified plan view of an anti-jack-knife assembly in accordance with the present invention.

The assembly may be constructed by locating a cylinder end flange 236 and bolting it to the body of the cylinder 226 with bolts 238. A fifth wheel flange bolt assembly 240 attaches the cylinder to the fifth wheel as illustrated in FIG. 6. Similarly, king pin plate and restrictor plate bolts 242 attach the restrictor plate 224 to the king pin plate 218.

In operation, in connection with a truck and trailer combination with a fifth wheel assembly, the pin remains retracted until the driver or passenger in the vehicle observes a weather or traffic condition that indicates a potential jack-knife situation. At that time the activation switch 18 is used to project the pin 42 into the slot 40. The pin restricts swing of the trailer to the arc of the slot. When the emergency or extreme conditions have passed the switch may be activated again to retract the pin and provide for full swing of the trailer.

In the other preferred embodiment described above the pin 132 is activated for projection in a similar manner. Additionally, a guide means is provided to further stabilize relative movement of the truck and trailer portions of the hitch arrangement.

The lower support plate 122 moves within the channel defined by the lateral guide member 124 and the lower surfaces of the structural members forming the trailer hitch yoke support members 126. This arrangement further stabilizes the hitch assembly and is believed to provide a more level ride for the trailer.

Further describing the operation of the improved anti-jack-knife assembly of the present invention it will be known to design and manufacture the retractable pins 42 and 132 as well as the cylinder pin 222 from suitable materials in accordance with conventional.

An example of design criteria can be found in Transport Canada Publication No. TP9963E, Project No. 7150/7151, "Development of an Anti-jackknifing System for Tractor Semitrailers: Feasibility Study, Phase I", by S. L. Dorian, H. E. Vietinghoff, and J. G. Packard, TES Limited, 308 Legget Drive, Kanata, Ontario K2K 1Y6, incorporated herein by reference.

Undoubtedly other standard references would be used by one skilled in the art to determine the design criteria for the materials used in manufacturing the components of the assembly of the present invention.

What the cited and standard references do not anticipate however, is the ability to incorporate a kick back effect into the anti-jack-knife assembly. It has been observed that an improved assembly for a conventional tractor and trailer rig having components of the dimensions illustrated in Appendix A responds substantially differently with respect to conventional anti-jack-knife devices.

It will be appreciated that the other anti-jack-knife assemblies illustrated and described herein can also be suitably modified to provide the desired rebound or kick back for their generally smaller and lighter associated truck and trailer arrangements.

Thus, with anti-jack-knife assembly components manufactured from the disclosed materials or their equivalents the following assembly response is noted. The trailer (e.g., any combination illustrated in FIGS. 1–8 or equivalent) begins to jack-knife. As the trailer swings away from the imaginary centerline 210 it is limited by the radius of the arc of the groove or pin receiving slot 40, 130, or 244. The momentum of the trailer causes a deformation of the anti-jack-knife assembly so as to cause a kick back or rebound of the trailer towards the centerline 210.

The mechanism of the rebound or kick back is not completely understood, however, the results are decisive. The trailer rebounds towards the centerline and forward motion of the truck and trailer tend to damp the swing of the trailer and allow the trailer to return to the centerline, thereby allowing the driver to recover from the jack-knife.

Earlier versions of the anti-jack-knife assembly have been observed to limit the swing of the trailer as desired. It has only been in later stages of development that the rebound was observed. It is believed that the modification of materials is the reason for this unexpected rebound or kick back effect. In one preferred embodiment the pin member is manufactured of a heat treated, 4140 steel or its equivalent and a pin member receiving plate is manufactured of a mild, cold rolled steel or its equivalent.

It is believed that the designs of conventional anti-jack-knife devices as well as earlier unimproved models of the presently improved embodiment of the disclosed anti-jack-knife assembly had provided assembly members designed to withstand maximum loads plus whatever safety factor was applied. This is certainly not a design or manufacturing flaw. However, the present improvement illustrates the application of an additional design factor, that is selecting a material with sufficient bending ability to kick the trailer back to the centerline.

It is believed that the redesigned pin deforms without shearing and forces the trailer back to the centerline 210 when the pin returns to its normal shape.

It is an operating characteristic of the further improved invention to provide positive activation of the pin in cylinder 226, or 44 or 134 whether the pin is extended or retracted. The single acting with, for example, spring return depends upon the cylinder remaining free from internal debris and obstructions. The service experienced by the cylinder without question will be severe. Therefore, the improvement of adding a double acting, positive acting cylinder, whether hydraulic, compressed air, vacuum, or equivalent improves the operation of the invention.

Modifications to the operating mechanism will require the necessary valves and piping or tubing and a modification of any switch or actuation device to indicate retraction or extension of the pin. Another operational system would provide for activating the switch once for retraction and again for extension as desired.

Figure 9:
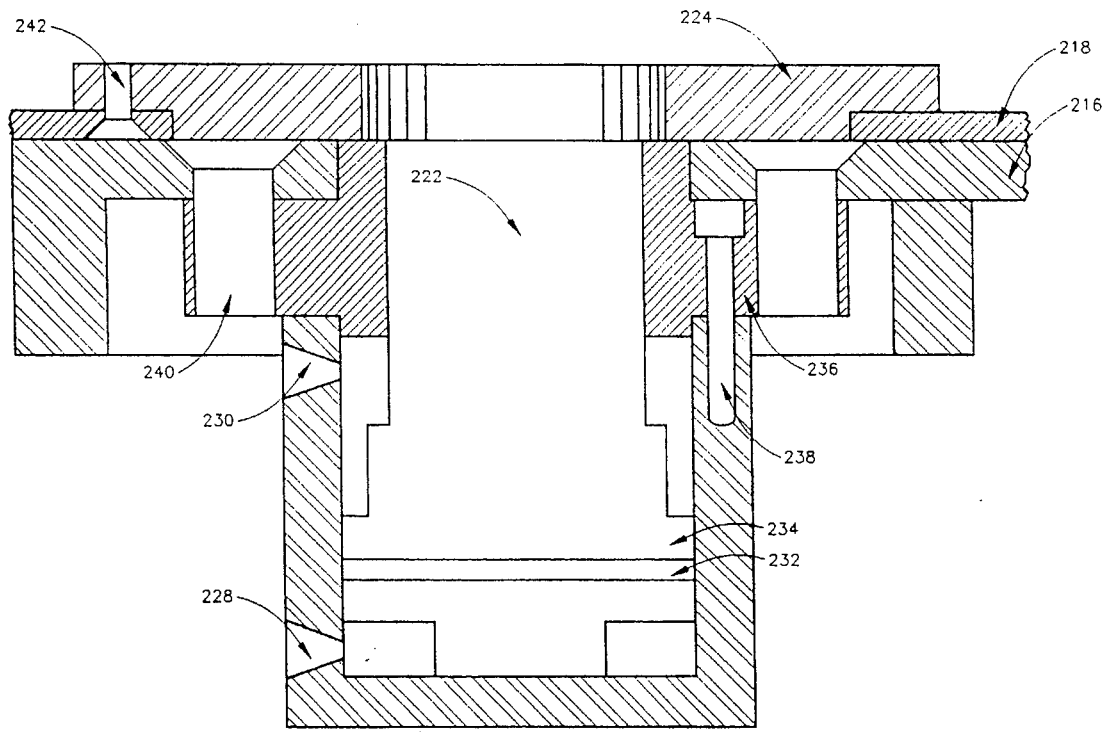
FIG. 9 is a cross-sectional view of an improved pin actuator constructed in accordance with an improved feature of the present invention.

The cylinder modification depicted in FIG. 9 is applicable to the cylinder assemblies depicted in FIGS. 1–8

From the foregoing description those skilled in the art will appreciate that the objects of the present invention are realized. An improved anti-jack-knife assembly is provided that adapts for use on pickup truck and trailer combinations.

It will be understood that the disclosed assembly is readily adaptable for use with other relatively lighter towed vehicles. A passenger automobile trailer hitch may be adapted for use with this invention. The improved trailer hitch of this invention is constructed with a retracting and a projecting pin assembly. The pin assembly is operated from the towing vehicle.

The present invention is provides an anti-jack-knife assembly constructed for improved reliability and operating characteristics in a jack-knife situation. The improved assembly further provides a positive acting actuator cylinder. The present invention provides an improved anti-jack-knife assembly construction that is adapted for overcoming a jack-knifed position with the intention of allowing a driver to regain vehicle control sooner by including a kick back or rebound feature.

While specific embodiments have been shown and described, many variations are possible. The particular shape of the hitch assembly including the dimensions may vary. The retraction mechanism may include a pin projection upon failure arrangement. In this manner, should a power supply fail, the pin would automatically project into the slot.

Since the truck and trailer combination may still be driven with the pin projecting in the slot, this feature would insure that should an extreme condition be encountered before the power supply was fixed, or if the power supply failure was part of the extreme condition, then the anti-jack-knife arrangement would automatically be in place.

The particular shape of the pin and cylinder and arrangement of the dual ports can be modified to provide the desired service to suit the equipment with which it is used. The materials may vary although the disclosed materials allow the desired rebound of the trailer.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A stabilizing assembly for preventing trailing member jack-knifing, the assembly comprising:

a pick-up truck adapted by the addition of a hitch assembly for pulling a trailing vehicle;

the truck hitch assembly including a support plate, a radial groove defined by the support plate, and a hitch ball, the radius of the groove centered on the hitch ball;

a trailer adapted for hitching to the pick-up truck, the adaptation comprising a hitch member and a retractable pin assembly;

the retractable pin assembly has a pin mounted for operative engagement with the radial groove defined by the support plate, thereby restricting trailing vehicle jack-knife with respect to the vehicle;

means for activating the retractable pin assembly for selective engagement of the retractable pin assembly with the radial groove; and stabilizing means operatively associated with the hitch means for stabilizing the support plate relative to the trailer hitch member and providing support during arcuate movement of the stabilizing assembly and the relative movement between the pick-up portion and the trailer portion of the hitch assembly during both normal and jack-knife restricting operation as the weight of portion of the trailer hitch member bears down on the truck hitch assembly and the stabilizing means acts to maintain the pin in operative engagement with the radial groove.

2. A stabilizing assembly as set forth in claim 1 wherein the pin of the retractable pin assembly is normally retracted.

3. A stabilizing assembly as set forth in claim 1 wherein the pin of the retractable pin assembly is normally extended.

4. A stabilizing assembly for preventing trailing member jack-knifing, the assembly comprising:

a vehicle adapted for pulling a trailing vehicle;

a hitch member connecting the vehicle and the trailing member, the hitch member including an upper member and a lower member, the lower hitch member mounted on a plate member at least partially supporting the upper hitch member, the plate member defining a radial groove, the radius of the groove centered at a pivot point between the upper hitch member and the lower hitch member;

a retractable pin assembly having a pin carried by the upper hitch member and the radial groove receiving the pin when not retracted;

a mechanism for activating the pin; and guide means operatively interconnecting the upper and the lower hitch members.

5. A stabilizing assembly as set forth in claim 4 wherein the pin of the retractable pin assembly is normally retracted.

6. A stabilizing assembly as set forth in claim 4 wherein the pin of the retractable pin assembly is normally extended.

7. A method of stabilizing a trailer and reducing the potential for the trailing member to jack-knife, comprising the steps of:

adapting a pick-up truck and a trailer by the addition of a hitch assembly having a pivot for allowing the truck to pull the trailer;

supporting the hitch assembly with a support plate on the pick-up truck during arcuate movement of the trailer;

providing a radial groove in the support plate, the radius of the groove centered on the pivot of the hitch assembly;

mounting a retractable pin assembly with a pin on the trailer and relative to the support plate for extension of the pin into the radial groove of the support plate to engage the pin with the radial groove;

restrict trailing vehicle jack-knife with respect to the vehicle;

activating the pin of the retractable pin assembly for selective engagement of the pin with the radial groove; and stabilizing the hitch assembly relative to the trailer hitch member and maintaining the pin in operative engagement with the radial groove.

8. A stabilizing method as set forth in claim 7 further comprising the step of normally retracting the pin of the retractable pin assembly.

9. A stabilizing method as set forth in claim 7 further comprising the step of normally extending the pin of the retractable pin assembly.

10. A stabilizing assembly for preventing trailing member jack-knifing, the assembly comprising:

a vehicle adapted for pulling a trailing vehicle;

a hitch member connecting the vehicle and the trailing member, the hitch member including an upper member and a lower member, the lower hitch member mounted on a plate member at least partially supporting the upper hitch member, the plate member defining a radial groove, the radius of the groove centered at a pivot point between the upper hitch member and the lower hitch member;

a retractable pin assembly having a pin carried by the upper hitch member and the radial groove receiving the pin when not retracted;

a mechanism for activating the pin; and guide means operatively interconnecting the upper and the lower hitch members.

11. A stabilizing assembly as set forth in claim 10 wherein the pin of the retractable pin assembly is normally retracted.

12. A stabilizing assembly as set forth in claim 10 wherein the pin of the retractable pin assembly is normally extended.

* * * * *